(12) United States Patent
Wu

(10) Patent No.: US 9,557,802 B2
(45) Date of Patent: Jan. 31, 2017

(54) METHOD OF CONTROLLING SDIO DEVICE AND RELATED SDIO SYSTEM AND SDIO DEVICE

(71) Applicant: MEDIATEK INC., Hsin-Chu (TW)

(72) Inventor: Chih-Pin Wu, Yunlin County (TW)

(73) Assignee: MEDIATEK INC., Hsin-Chu (TW)

( * ) Notice: Subject to any disclaimer, the term of this patent is extended or adjusted under 35 U.S.C. 154(b) by 155 days.

(21) Appl. No.: 14/160,502

(22) Filed: Jan. 21, 2014

(65) Prior Publication Data

US 2015/0039923 A1 Feb. 5, 2015

Related U.S. Application Data

(60) Provisional application No. 61/861,378, filed on Aug. 1, 2013.

(51) Int. Cl.
*G06F 1/32* (2006.01)
*G06F 1/26* (2006.01)

(52) U.S. Cl.
CPC ............. *G06F 1/3278* (2013.01); *G06F 1/266* (2013.01); *G06F 1/3275* (2013.01); *Y02B 60/126* (2013.01); *Y02B 60/1225* (2013.01); *Y02B 60/1228* (2013.01)

(58) Field of Classification Search
CPC .................................................. G06F 1/3278
See application file for complete search history.

(56) References Cited

U.S. PATENT DOCUMENTS

| | | | | |
|---|---|---|---|---|
| 8,170,624 B1 * | 5/2012 | Huang | ............. | H04W 52/0209 455/127.1 |
| 9,098,259 B1 * | 8/2015 | Lachwani | ................ | G06F 1/26 |
| 2005/0237160 A1 | 10/2005 | Nolan | | |
| 2007/0168652 A1 * | 7/2007 | Mylly | ................... | G06F 9/4401 713/2 |
| 2009/0177816 A1 * | 7/2009 | Marx | ................. | G06F 13/1668 710/72 |
| 2011/0246760 A1 * | 10/2011 | Ueta | ..................... | G06F 9/4401 713/2 |
| 2011/0276748 A1 * | 11/2011 | Toyama | ................ | G06F 9/4403 711/103 |
| 2013/0183954 A1 * | 7/2013 | Huang | .................. | H04W 52/02 455/418 |
| 2013/0268788 A1 * | 10/2013 | Baum | ............... | H04L 25/03891 713/323 |

FOREIGN PATENT DOCUMENTS

CN 1957380 A 5/2007

* cited by examiner

*Primary Examiner* — Thomas Lee
*Assistant Examiner* — Chad Erdman
(74) *Attorney, Agent, or Firm* — Winston Hsu; Scott Margo

(57) ABSTRACT

Described in embodiments herein are techniques for placing a secure digital input output (SDIO) device in a sleep mode and waking up the SDIO device from the sleep mode. In accordance with an embodiment, a method of controlling the SDIO device comprising: writing a control value into a register of the SDIO device; allowing the SDIO device to switch to a first operation mode based on the control value written into the register; sending a first signal to the SDIO device through a first data terminal of the SDIO device; and allowing the SDIO device to switch to a second operation mode based on the first signal.

37 Claims, 7 Drawing Sheets

METHOD OF CONTROLLING SDIO DEVICE AND RELATED SDIO SYSTEM AND SDIO DEVICE

CROSS REFERENCE TO RELATED APPLICATIONS

This application claims the benefit of U.S. provisional application No. 61/861,378, filed on Aug. 1, 2013 and incorporated herein by reference.

BACKGROUND

The present invention relates generally to secure digital input output (SDIO), and more particularly, to a mechanism for placing an SDIO device in a sleep mode and waking up the SDIO device from the sleep mode.

Secure digital input output (SDIO) is an interface standard extended from secure digital (SD) standard, which not only can be applied in storage devices like flash memory cards, but also can be used to interface peripheral devices such as Wi-Fi wireless network cards, global positioning system (GPS) receivers, and Bluetooth adapters. Typically, an SDIO card that is combined with the above-mentioned Wi-Fi network card, GPS receivers, and Bluetooth adapter is called an SDIO device. The SDIO device is hosted by an SDIO host, together forming an SDIO system. Sometimes, functions on the SDIO device provided by the peripheral devices may be temporarily unnecessary for the user. In order to reduce the power consumption of the SDIO system, the SDIO device may be switched to an idle mode by using clock gating technique. Such technique can effectively reduce the dynamic power dissipation by disabling the switching of logic gates in the SDIO device. However, the static power dissipation caused by the leakage current cannot be reduced by the clock gating technique.

A common method of reducing the static power dissipation is to reduce a level of a supply voltage supplied to the SDIO device. However, in some conditions, if the level of the supply voltage is decreased to a certain extent, the capability of the SDIO device for receiving incoming signals sent from the SDIO host may be affected. This is because it is hard for a receiver of the SDIO device to correctly decode the high frequency signals defined in the SDIO specification, while being operated with low supply voltage. In the worst case, the SDIO device may fail to receive the signal that is used for waking up the SDIO device from the idle mode. This disadvantageously increases the time required by waking up SDIO device and correctly responding to the SDIO host.

It is thus desirable to have a mechanism that is capable of waking up SDIO device that is supplied with a lower supply voltage.

SUMMARY

It is one objective of the present invention to reduce a supply voltage supplied to a SDIO device when the SDIO device is placed in a sleep mode. In the present invention, a wake-up mechanism is achieved by building channels to transmit a request of waking up the SDIO device in the sleep mode and a response of acknowledging the SDIO device has been woke up. These channels are built on the traditional SDIO data bus.

According to a first aspect of the present invention, a method of controlling an SDIO device is provided. The method comprises: writing a control value into a register of the SDIO device; allowing the SDIO device to switch to a first operation mode based on the control value written into the register; sending a first signal to the SDIO device through a first data terminal of the SDIO device; and allowing the SDIO device to switch to a second operation mode based on the first signal.

According to a second aspect of the present invention, a method applied in an SDIO system including an SDIO host and an SDIO device is provided. The method comprises: sending a command from the SDIO host to the SDIO device to write a control value into a register of the SDIO device; allowing the SDIO device to switch to a first operation mode based on the control value written into the register; sending a first signal from the SDIO host to the SDIO device through a data bus between the SDIO host and the SDIO device; and allowing the SDIO device to switch to a second operation mode based on the first signal.

According to a third aspect of the present invention, an SDIO device capable of operating in a first operation mode and a second operation mode is provided. The SDIO device comprises: a register and a mode control circuit. The register is operably arranged for storing a control value that allows the SDIO device to switch to the first operation mode. The mode control circuit is arranged for receiving, through a first data terminal of the SDIO device, a first signal that allows the SDIO device to switch to the second operation mode. When the control value is written into the register, the SDIO device is switched to the first operation mode, and when the first signal is received, the SDIO device is switched to the second operation mode.

According to a fourth aspect of the present invention, an SDIO system including an SDIO host an SDIO device that is capable of operating in a first operation mode and a second operation mode is provided. The SDIO device comprises: a register that is operably arranged for storing a control value that allows the SDIO device to switch to the first operation mode; and a first mode control circuit that is arranged for receiving, through a data bus, a first signal that allows the SDIO device to switch to the second operation mode. The SDIO host comprises: a second mode control circuit that is arranged for sending the first signal to the SDIO device through the data bus through the data bus; and a SDIO host control module that is arranged for issuing a command to write the control value into the register with. When the control value is written into the register with the command issued by the SDIO host, the SDIO device is switched to the first operation mode, and when the first signal sent by the SDIO host is received by the SDIO device, the SDIO device is switched to the second operation mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
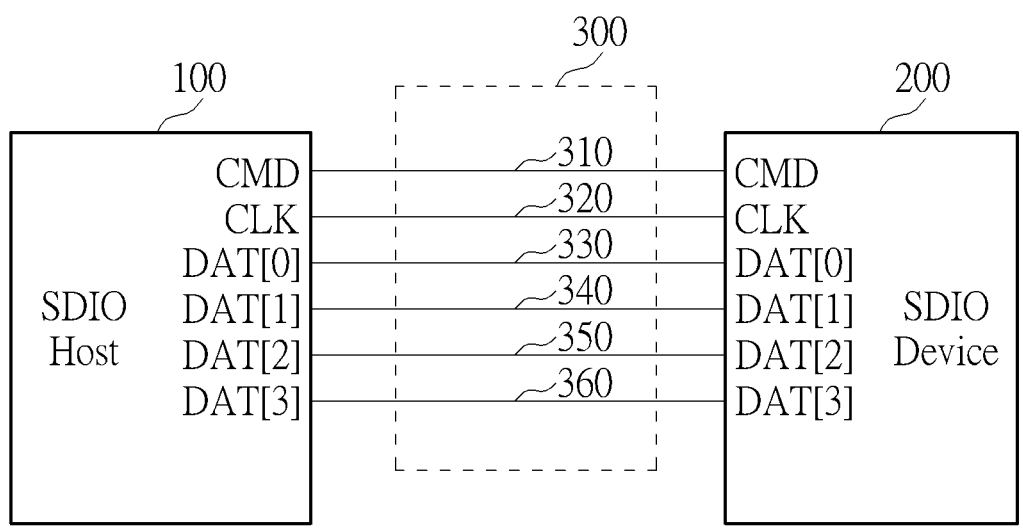
FIG. 1 illustrates a schematic diagram of an SDIO host and a SDIO device.

FIG. 1 illustrates an SDIO host 100 and an SDIO device 200. The SDIO host 100 and SDIO device 200 are connected through an SDIO bus 300. The SDIO bus 300 includes a command line 310, a clock line 320 and four data lines 330-360, each respectively connected to corresponding signal pins/contacts (hereinafter as terminals) of the SDIO host 100 and the SDIO device 200. The command line 310 is used by the SDIO host 100 to issue a command to the SDIO device 200, which may be configuration commands, data transfer commands, and so on. Also, the SDIO device 200 returns responses with respect to received commands through the command line 310. The clock line 320 is used by the SDIO host 100 to transmit a clock signal for the SDIO device 200 in synchronization with the SDIO host 100. The data lines 330-360 is used by the SDIO host 100 or the SDIO device 200 to transmit data according to SDIO access conducted by the SDIO host 100.

Figure 2:
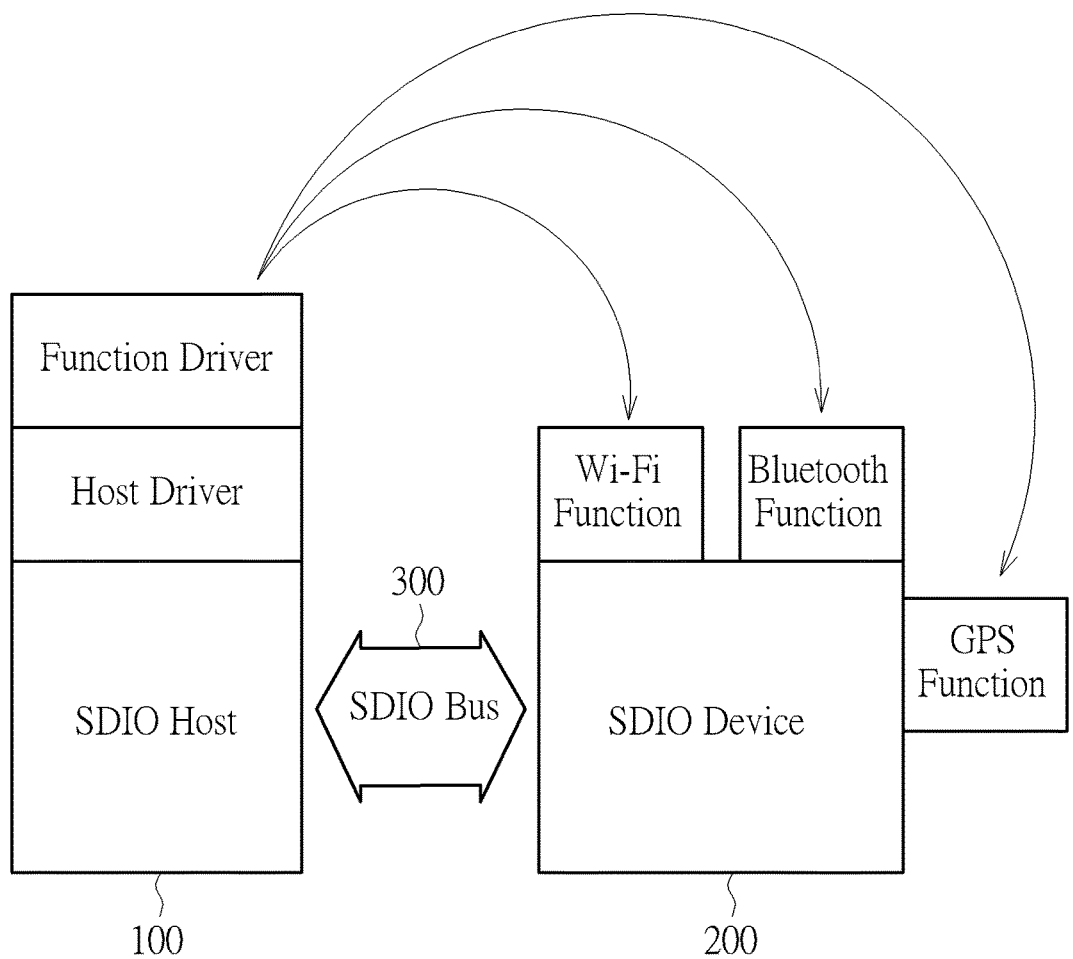
FIG. 2 illustrates a schematic diagram of an SDIO host and a SDIO device in a software view.

FIG. 2 illustrates a schematic diagram of the SDIO host 100 and the SDIO device 200 in a software view. Typically, the SDIO host 100 is controlled by a host driver and one or multiple function drivers. One or multiple function drivers correspond to functional modules on the SDIO device 200, such as Wi-Fi module, Bluetooth module and/or GPS module. The host driver instructs the SDIO host 100 how to communicate with SDIO device 200 according to the SDIO specification. The function driver utilizes the host driver to make the functional module to have its corresponding function on the SDIO device 200.

Figure 3:
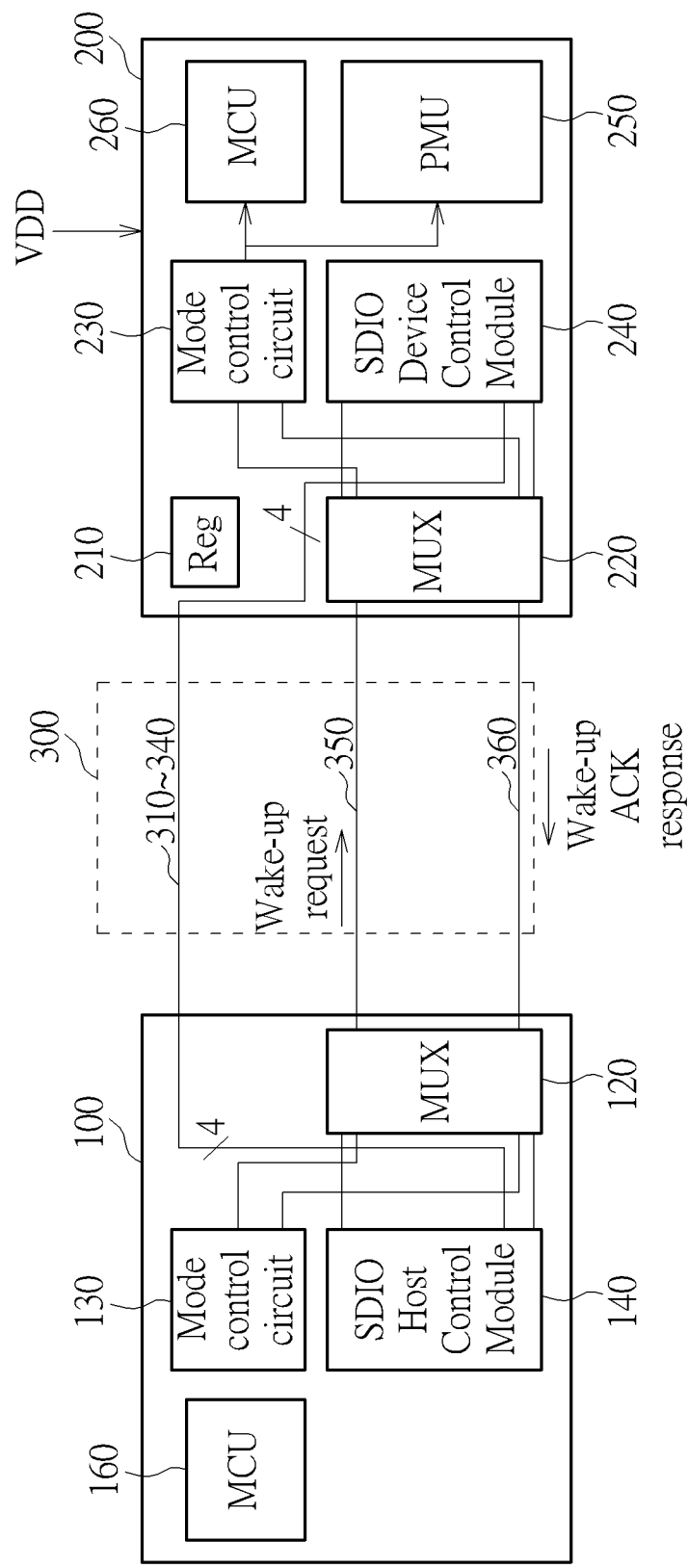
FIG. 3 illustrates a block diagram of an SDIO host and a SDIO device according to one embodiment of the present invention.

It is illustrated herein how to use the SDIO host 100 to control the SDIO device to switch between a normal operation mode and a sleep mode in conjunction with FIG. 3. At first, when the SDIO device 200 finds its functional modules may not be used for a while, the SDIO device 200 will determine to enter the sleep mode. The SDIO device 200 signals the SDIO host 100 of a sleep request. When the SDIO host 100 determines it is permissible to permit the SDIO device 200 to switch to the sleep mode. The SDIO host 100 issues a command to write a register 210 of the SDIO device 200 through the command line 310. This can be done by the micro-processing unit (MCU) 160 instructing a SDIO host control module 140 to issue the command. This command could be a CMD52 defined in the SDIO specification, which is the simplest means to access a single register, and typically writes 1 byte using only one command/response pair. However, it is also available to use other types of commands defined in the SDIO specification to write the register 210 of the SDIO device 200, such as a CMD53, which allows the writing of multiple registers with a single command. The register 210 could be one of Common Control Registers (CCCR) registers. Normally, these CCCR registers include 16 registers reserved for the manufacturers for special operations. The present invention uses one of the CCCR registers to control the SDIO device 200. According to one embodiment, one of bit fields of the register 210 could be written with the value of 1. However, this is not a limitation of the present invention. Any other possible control value can be used to write one or more bits fields in the register 210, thereby informing the SDIO device 200 of switching to the sleep mode.

After the SDIO host 100 uses the command to write the register 210 with the control value as mentioned above, an interrupt will be generated to inform the MCU 260. The MCU 260 accordingly checks the register 210, and finds the control value of 1 is written. Accordingly, the SDIO device 200 starts to switch to the sleep mode. Once switching to the sleep mode, a multiplexer 220 of the SDIO device 210 will allow a mode control circuit 230 to couple to the SDIO bus 300, and terminates a connection between the SDIO bus 300 and a SDIO device control module 240. As will be illustrated later, the mode control circuit 230 is utilized for receiving a wake-up request and accordingly returning a wake-up acknowledgement response. The SDIO device control module 240 is generally utilized for interpret commands received from the SD host 100 through the SDIO bus 300 and returns a necessary response. The SDIO device control module 240 handles the exchange of data between the SDIO host 100 and SDIO device 200. The SDIO device control module 240 puts data onto the data line 330-360 of the SDIO bus 300 based on access commands issued by the SDIO host 100. Also, the SDIO device control module 240 acquires the data from data line 330-360 and stores the data into a memory. Furthermore, when the SDIO device 200 is switched to the sleep mode, a power management unit 250 regulates a supply voltage VDD down to a lower level, thereby decreasing the static power dissipation of the SDIO device 200. As there is no need for the SDIO device 240 to receive the high frequency signals defined in the SDIO specification, the supply voltage could be pretty low, thereby greatly reduce the power consumption. According to various embodiments of the present invention, there may be other feasible ways to reduce the power consumption of the SDIO device 200 without reducing the supply voltage VDD. For example, shutting down at least a part of circuits in the SDIO device 200 also can reduce the power consumption of the SDIO device 200. In addition, it is also feasible to combine the way of shutting down at least a part of circuits in the SDIO device 200 with the way of reducing the supply voltage VDD to have the power consumption as low as possible.

When the SDIO device 200 is switched to the sleep mode, a multiplexer 120 of the SDIO host 100 will also allow a mode control circuit 130 of the SDIO host 100 to couple to the SDIO bus 300, and terminate the connection between the SDIO bus 300 and a SDIO module 140. As will be illustrated later, the mode control circuit 130 is utilized for sending the wake-up request and accordingly receiving the wake-up acknowledgement response. The SDIO host module 140 is sending commands to the SD device 100 through the SDIO bus 300 with the control of the MCU 160. Also, the SDIO host module 140 handles the exchange of data between the SDIO host 100 and SDIO device 200, which includes put the data onto the data lines 330-360 and acquires the data sent from the SDIO device 200. During the period that the SDIO device 200 is switched to the sleep mode, the SDIO host 100 monitors any SDIO access to the SDIO device 200 conducted by any function drivers or other software components (e.g. host driver or bus driver). Once the SDIO host 100 finds that any of the function drivers or software components attempts to conduct the SDIO access to the SDIO device 200, the SDIO host 100 suspends the SDIO access, and starts a wake-up process.

When entering the wake-up process, the mode control circuit 130 at first sends a wake-up request to the SDIO device 200 by changing a level on one of data lines 330-360, for example, the data line 350, which is the DAT[2] defined in the SDIO specification. The changing of the level may last for a certain period until the SDIO device 200 detects it. According to various embodiment of the present invention, the mode control circuit 130 may assert or de-assert the level on the data line 350 depending on the original level of the data line. Typically, as SDIO signaling uses high level as a signal idle state (i.e. active low), the mode control circuit 130 de-asserts the level on the data lines 350 to send the wake-up request.

When the mode control circuit 230 of the SDIO device 200 detects the changing of the level on the data line 350, the mode control circuit 230 informs the SDIO device 200 by sending an interrupt to the MCU 260 of the SDIO device 200. The MCU 260 determines whether to switch back to the normal operation mode. Once the MCU 260 determines to switch back to the normal operation mode, the PMU 250 is asked to recover the supply voltage up to its original level. In addition, if a part of the circuits of the SDIO device 200 is shut down in the sleep mode, this part of the circuits will be asked to turn on when the MCU 260 determines to switch back to the normal operation mode. After these operations are finished, the mode control circuit 230 sends a wake-up acknowledgement response by changing a level on one of data lines 330, 340, and 360, for example, the data line 360, which could be the DAT[3] defined in the SDIO specification. The changing of the level on the data line 360 may be last for a certain period until the SDIO host 100 detects it. After this, the multiplexer 220 allows SDIO device control module 240 to re-couple to the SDIO bus 300, and terminates the connection between the SDIO bus 300 and the mode control circuit 230. At present, the SDIO device 200 is ready to operate in response to the SDIO access from the SDIO host 100.

On the other hand, when the mode control circuit 130 of the SDIO host 100 receives the wake-up acknowledgement response by detecting the changing of the level on the data line 360, the mode control circuit 130 informs the MCU 160 of the SDIO host 100. Then, the multiplexer 120 allows the SDIO host control module 140 to re-couple to the SDIO bus 300, and terminates the connection between the SDIO bus 300 and the mode control circuit 130. Afterwards, the MCU 160 will allow the suspended SDIO access to be continued and asks the SDIO host control module 140 to handle the SDIO access to issue command and put data on the data lines.

Figure 4:
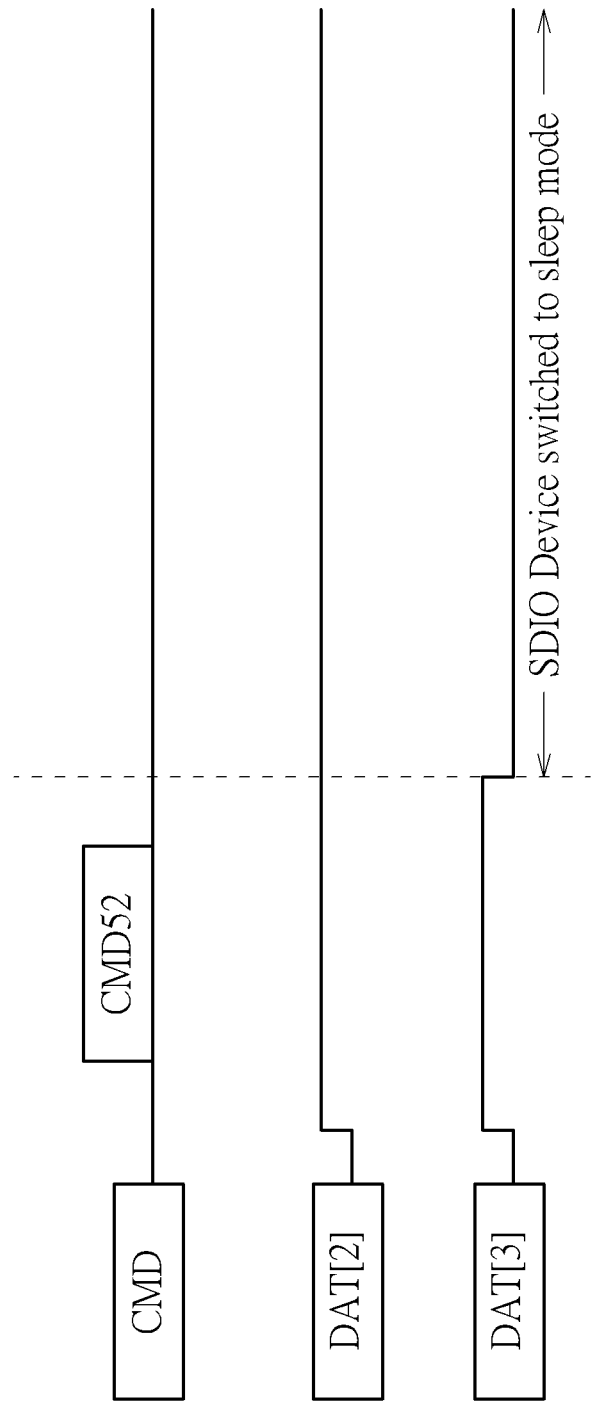
FIG. 4 and FIG. 5 illustrate timing charts of signals on the SDIO bus according to one embodiment of the present invention.
Figure 5:
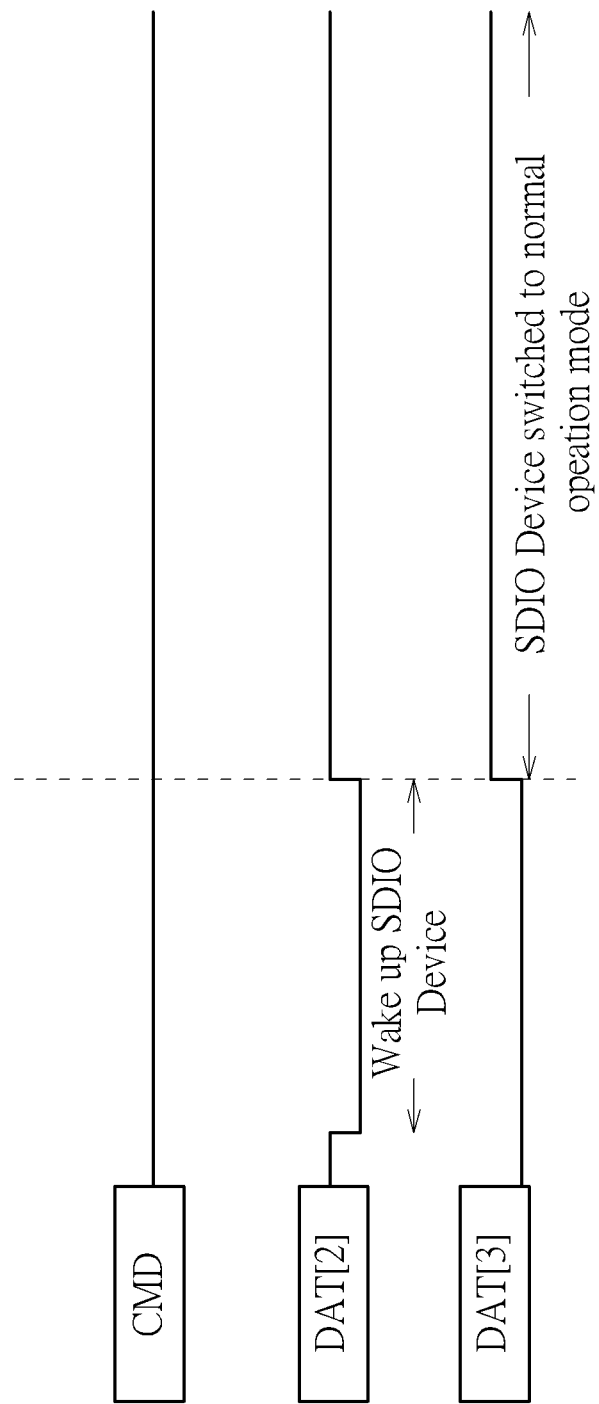

Timing charts of signals on the SDIO bus 300 when the SDIO device 200 switched to the sleep mode and the normal operation mode are illustrated in FIG. 4 and FIG. 5, respectively. Referring to FIG. 4, it is illustrated the level on the data line 360 for transmitting the wake-up acknowledgment response is de-asserted (i.e. active high) after the command CMD52/CMD53 including the control value of 1 is sent to the SDIO device 200 through the command line 310. That is, the wake-up acknowledgment response will be sent later with a high level on the data line 360. However, this is not a limitation.

As is illustrated in FIG. 5, when the wake-up request is sent to the SDIO device 200 by de-asserting the level on the data line 350 (i.e., active low), the wake-up acknowledge response accordingly is sent by asserting the level on the data line 360 as long as the SDIO device is ready to switched back to the normal operation mode. As a consequence, the SDIO host 100 can use the command line 310 or the data lines 330-360 to perform SDIO access. Please note that, the above-mentioned levels of signals are just directed to a possible implementation of the present invention, instead of a limitation. For example, the wake-up request may be sent with a high level on any other data lines whereas the wake-up acknowledge response may be sent with a low level on any other data lines.

Figure 6:
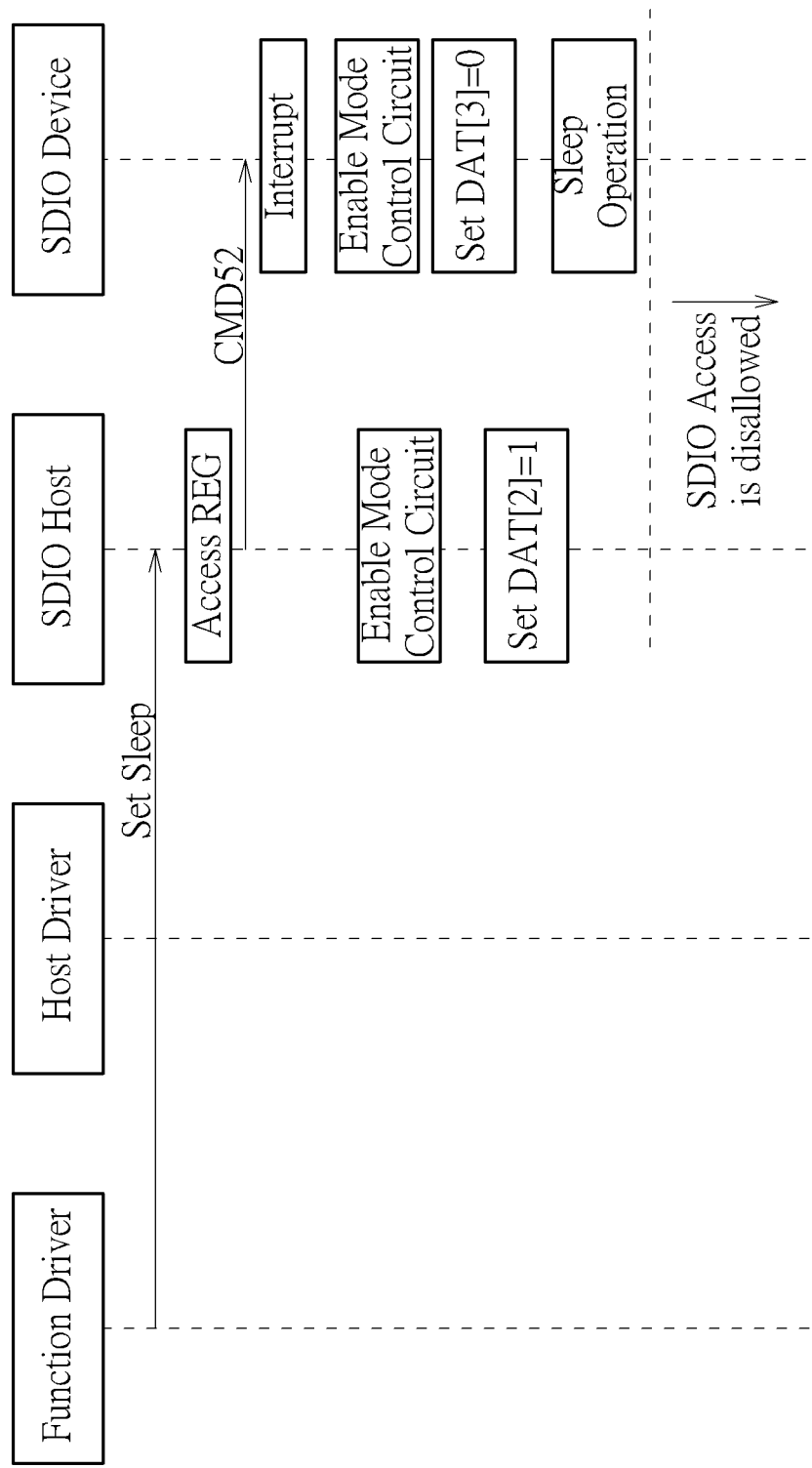
FIG. 6 and FIG. 7 illustrate sequence charts of behaviors between the SDIO host and the SDIO device according to one embodiment of the present invention.
Figure 7:
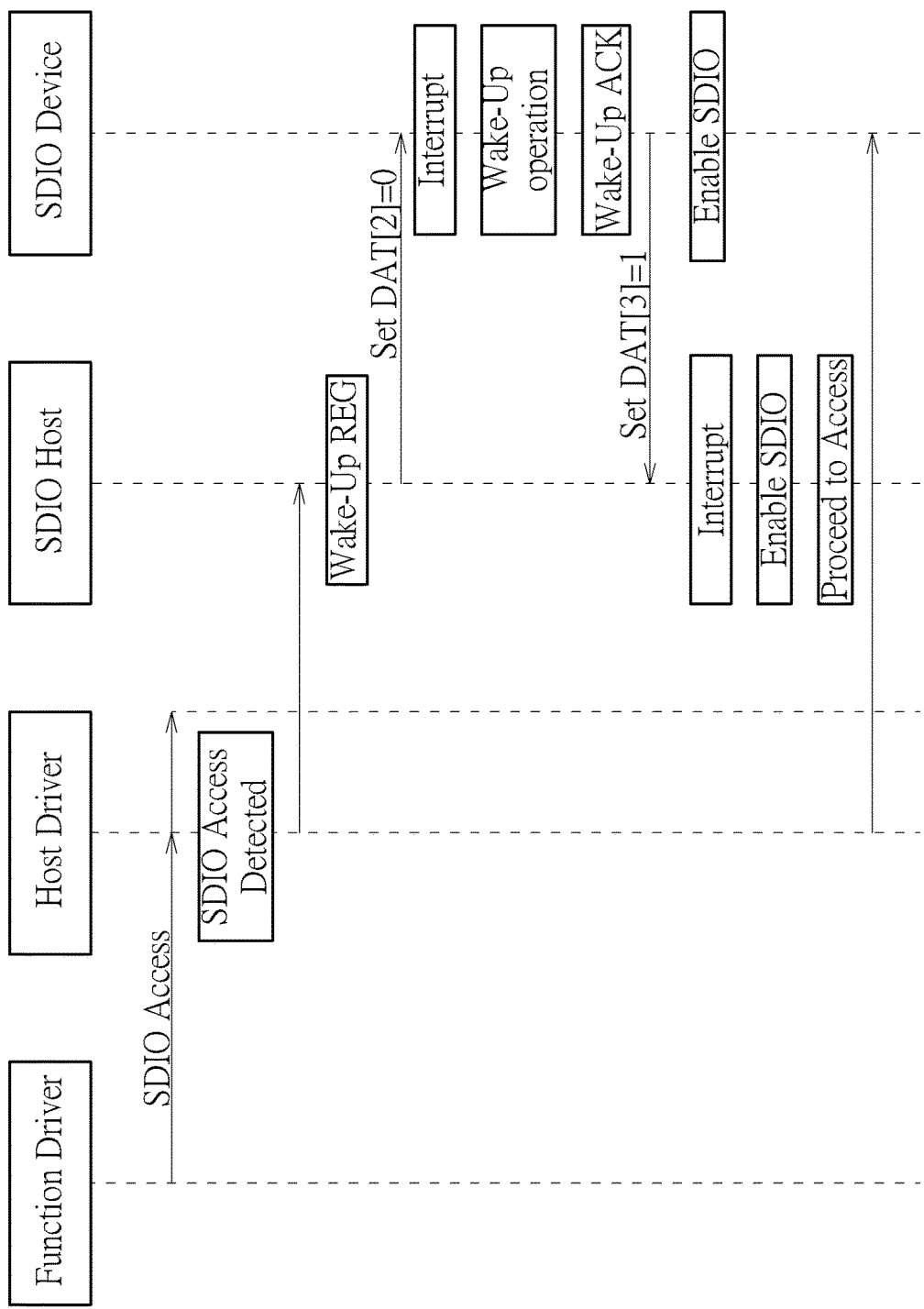

FIG. 6 and FIG. 7 illustrate sequence charts of behaviors between software and hardware when switched to the sleep mode and the normal operation mode. Referring to FIG. 6, at first, the function driver sets the SDIO device 200 to switch to the sleep mode according to a sleep request from the SDIO device 200. With the control of the function driver, the host driver asks the SDIO host 100 to instruct the SDIO device 200 to switch to the sleep mode. Therefore, the SDIO host 100 issues the command (CMD52/CMD53) to the SDIO device, writing the control value of 1 into the register 210. After that, the SDIO device 200 will be switched to the sleep mode, and utilizes the mode control circuit 230 to handling the wake-up request and wake-up acknowledgement response. The mode control circuit 230 preferably de-asserts the data line 360 (DAT[3]=0). Then, the PMU 250 reduces the supply voltage (i.e. sleep operation); or a part of the circuits of the SDIO device 200 is shut down. On the other hand, the host driver controls the SDIO host 100 to operate in response to the sleep mode. The SDIO host 100 will utilize the mode control circuit 130 to handle the wake-up request and the wake-up acknowledgement response. Preferably, the data line 350 is maintained asserted (DAT[2]=1). In one embodiment, before the function driver sets the SDIO device 200 to the sleep mode, the function driver may have set the SDIO device 200 to an idle mode. In this idle mode, a clock signal to enable the SDIO device 200 is gated by using the clock gating technique. That is, the function driver actually sets to the sleep mode when the SDIO device 200 has already placed in the idle mode.

FIG. 7 illustrates the sequence chart regarding waking up the SDIO device 200. At first, the function driver or other software components may attempt to conduct a SDIO access to the SDIO device 200. When the host driver detects the SDIO access, the host driver asks the SDIO host 100 to wake up the SDIO device 200 and suspending the SDIO access. The SDIO host 100 sends the wake-up request by de-asserting the level on the data signal 350 (DAT[2]=0). The mode control circuit 230 detects the wake-up request, and generates an interrupt to the MCU 260. The MCU 260 will control other components in the SDIO device 200 for waking-up. For example, the PMU 250 is asked to recover the supply voltage to its original level; or those circuits that have been shut down in the sleep mode is asked to turn on. When all the components are ready, the SDIO device 200 is switched to the normal operation mode. After that, the mode control circuit 230 returns the wake-up acknowledgement response (DAT[3]=1) to the SDIO host 100 to inform the SDIO host 100 that the SDIO device 200 is ready to handle any SDIO access. In a consequence, the mode control circuit 230 is replaced with the SDIO device control circuit 240 to handle signals on the data lines 350-360. An interrupt in the SDIO host 100 will be generated when detecting the wake-up acknowledgement response. The mode control circuit 130 is replaced with the SDIO host control circuit 140 to handle signals on the disabled by terminating the connection with the SDIO bus 300. The interrupt on the SDIO host 100 will notify the MCU 160 to proceed the SDIO access.

Embodiments of the invention may include functionality that may be implemented as software executed by a processor, hardware circuits or structures, or a combination of both. The processor may be a general-purpose or dedicated processor. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In conclusion, the present invention reduces the supply voltage supplied to the SDIO device without excessively extending the time required by waking up the SDIO device and correctly responding to the SDIO host. In addition, as the mechanism of the present invention is based on building communication channels on the original SDIO data bus, the manufacturing cost of the SDIO device as well as the complexity of the SDIO device is not significantly increased. As a result, the supply voltage in the sleep mode can be reduced as low as possible to reduce the power consumption of the SDIO system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a Secure Digital Input Output (SDIO) device, comprising:
    writing a control value into a register of the SDIO device;
    allowing the SDIO device to switch to a first operation mode based on the control value written into the register;
    sending a first signal to the SDIO device through a SDIO data bus to a first data terminal of the SDIO device; and
    allowing the SDIO device to switch to a second operation mode based on the first signal;
    wherein the method further comprises suspending a data exchange on the SDIO data bus when the SDIO device is switched to the first operation mode.

2. The method of claim 1, the step of allowing the SDIO device to switch to the second operation mode comprises:
    sending from the SDIO device a second signal, in response to the first signal, through a second data terminal of the SDIO device; and
    allowing the SDIO device to switch to the second operation mode.

3. The method of claim 2, wherein the first and the second data terminals of the SDIO device are data pins of the SDIO device.

4. The method of claim 1, wherein the first operation mode is a sleep mode and the second operation mode is a normal operation mode.

5. The method of claim 1, wherein when a power consumption of the SDIO device in the first operation mode is lower than the power consumption of the SDIO device in the second operation mode.

6. The method of claim 1, wherein a level of a supply voltage supplied to the SDIO device in the first operation mode is lower than that supplied to the SDIO device in the second operation mode.

7. The method of claim 1, wherein in the first operation mode, at least a part of the circuit in the SDIO device is shut down.

8. A method applied in a Secure Digital Input Output (SDIO) system including an SDIO host and an SDIO device, comprising:
    sending a command from the SDIO host to the SDIO device to write a control value into a register of the SDIO device;
    allowing the SDIO device to switch to a first operation mode based on the control value written into the register;
    sending a first signal from the SDIO host to the SDIO device through a SDIO data bus between the SDIO host and the SDIO device; and
    allowing the SDIO device to switch to a second operation mode based on the first signal;
    wherein the method further comprises suspending a data exchange on the SDIO data bus when the SDIO device is switched to the first operation mode.

9. The method of claim 8, the step of allowing the SDIO device to switch to the second operation mode comprises:
    allowing the SDIO device to send to the SDIO host the second signal, in response to the first signal, through the SDIO data bus; and
    allowing the SDIO device to switch to the second operation mode.

10. The method of claim 9, wherein the SDIO data bus includes a first data line and a second data line, and the first signal is sent from the SDIO host to the SDIO device through the first data line and the second signal is sent from the SDIO device to the SDIO host through the second data line.

11. The method of claim 8, wherein the first operation mode is a sleep mode and the second operation mode is a normal operation mode.

12. The method of claim 8, wherein when a power consumption of the SDIO device in the first operation mode is lower than the power consumption of the SDIO device in the second operation mode.

13. The method of claim 8, wherein a level of a supply voltage supplied to the SDIO device in the first operation mode is lower than that supplied to the SDIO device in the second operation mode.

14. The method of claim 8, wherein in the first operation mode, at least a part of the circuit in the SDIO device is shut down.

15. A Secure Digital Input Output (SDIO) device capable of operating in a first operation mode and a second operation mode comprising:
    a register, for storing a control value that allows the SDIO device to switch to the first operation mode; and
    a mode control circuit, for receiving, through a SDIO data bus to a first data terminal of the SDIO device, a first signal that allows the SDIO device to switch to the second operation mode;

wherein when the control value is written into the register, the SDIO device is switched to the first operation mode, and when the first signal is received, the SDIO device is switched to the second operation mode;

wherein a data exchange on the SDIO data bus is suspended when the SDIO device is switched to the first operation mode.

16. The SDIO device of claim 15, wherein the mode control circuit is arranged for sending, through a second data terminal of the SDIO device, a second signal in response to the first signal.

17. The SDIO device of claim 16, further comprising:
a SDIO device control module, for interpreting commands sent from an SDIO host and accordingly returns a response; and
a multiplexer, coupled to the SDIO device control module and the mode control circuit, for multiplexing the SDIO device control module and the mode control circuit to the first data terminal and the second data terminal;
wherein when the SDIO device is switched to the first operation mode, the multiplexer couples the mode control circuit to the first data terminal and the second data terminal, and when the SDIO device is switched to the second operation mode, the multiplexer couples the SDIO device control module to the first data terminal and the second data terminal.

18. The SDIO device of claim 16, wherein the first data terminal and the second data terminal are data pins of the SDIO device.

19. The SDIO device of claim 15, further comprising:
a power management unit, arranged for regulating a level of a supply voltage supplied to the SDIO device.

20. The SDIO device of claim 19, wherein when the SDIO device is switched to the first operation mode, the power management unit regulates the level of the supply voltage to be a lower level, wherein the supply voltage supplied to the SDIO device in the first operation mode is lower than that supplied to the SDIO device in the second operation mode.

21. The SDIO device of claim 15, wherein the first operation mode is a sleep mode and the second operation mode is a normal operation mode.

22. The SDIO device of claim 15, wherein in the first operation mode, at least a part of the circuit in the SDIO device is shut down.

23. The SDIO device of claim 15, wherein when a power consumption of the SDIO device in the first operation mode is lower than the power consumption of the SDIO device in the second operation mode.

24. A Secure Digital Input Output (SDIO) system, comprising:
an SDIO device capable of operating in a first operation mode and a second operation mode, comprising:
a register, for storing a control value that allows the SDIO device to switch to the first operation mode; and
a first mode control circuit, for receiving, through a SDIO data bus, a first signal that allows the SDIO device to switch to the second operation mode; and
an SDIO host, for controlling the SDIO device, comprising:
a second mode control circuit, for sending the first signal to the SDIO device through the SDIO data bus; and
a SDIO host control module, for issues a command to write the control value into the register;
wherein when the control value is written into the register by the command issued by the SDIO host, the SDIO device is switched to the first operation mode, and when the first signal sent from the SDIO host is received, the SDIO device is switched to the second operation mode;

wherein a data exchange on the SDIO data bus is suspended when the SDIO device is switched to the first operation mode.

25. The SDIO system of claim 24, wherein the first mode control circuit is arranged for sending, through the SDIO data bus, a second signal in response to the first signal, and the second mode control circuit is arranged for receiving through the SDIO data bus the second signal.

26. The SDIO system of claim 25, wherein the SDIO data bus includes a first data line and a second data line, and the first signal is sent from the SDIO host to the SDIO device through the first data line and the second signal is sent from the SDIO device to the SDIO host through the second data line.

27. The SDIO system of claim 24, wherein the SDIO device further comprises:
a SDIO device control module, for interpreting commands sent from an SDIO host and accordingly returns a response; and
a multiplexer, coupled to the SDIO device control module and the mode control circuit, for multiplexing the SDIO device control module and the mode control circuit to the SDIO data bus;
wherein when the SDIO device is switched to the first operation mode, the multiplexer couples the first mode control circuit to the SDIO data bus, and when the SDIO device is switched to the second operation mode, the multiplexer couples the SDIO device control module to the SDIO data bus.

28. The SDIO system of claim 24, wherein the SDIO host further comprises:
a multiplexer, coupled to the SDIO host control module and the second mode control circuit, for multiplexing the SDIO host control module and the second mode control circuit to the SDIO data bus;
wherein when the SDIO device is switched to the first operation mode, the multiplexer couples the second mode control circuit to the SDIO data bus, and when the SDIO device is switched to the second operation mode, the multiplexer couples the SDIO host control module to the SDIO data bus.

29. The SDIO system of claim 24, wherein the SDIO device further comprises:
a power management unit, for regulating a level of a supply voltage supplied to the SDIO device.

30. The SDIO system of claim 29, wherein when the SDIO device is switched to the first operation mode, the power management unit regulates the level of the supply voltage to be a lower level, wherein the level of the supply voltage supplied to the SDIO device in the first operation mode is lower than that supplied to the SDIO device in the second operation mode.

31. The SDIO system of claim 24, wherein the first operation mode is a sleep mode and the second operation mode is a normal operation mode.

32. The SDIO system of claim 24, wherein when a power consumption of the SDIO device in the first operation mode is lower than the power consumption of the SDIO device in the second operation mode.

33. The SDIO device of claim 24, wherein in the first operation mode, at least a part of the circuit in the SDIO device is shut down.

34. The method of claim 1, wherein the SDIO device is switched to the second operation mode from the first operation mode by changing a level on the first data terminal.

35. The method of claim 8, wherein the SDIO device is switched to the second operation mode from the first operation mode by changing a level on the SDIO data bus.

36. The SDIO device of claim 15, wherein the SDIO device is switched to the second operation mode from the first operation mode by changing a level on the first data terminal.

37. The SDIO system of claim 24, wherein the SDIO device is switched to the second operation mode from the first operation mode by changing a level on the SDIO data bus.

* * * * *